(12) United States Patent
Nash et al.

(10) Patent No.: US 7,328,516 B2
(45) Date of Patent: Feb. 12, 2008

(54) LASER LEVEL

(75) Inventors: Derek J. Nash, Huntersville, NC (US); John C. Smith, Denver, NC (US); Jeffrey L. Spanski, Weddington, NC (US); Michael James Burry, Troutman, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 0 days.

(21) Appl. No.: 11/161,497

(22) Filed: Aug. 5, 2005

(65) Prior Publication Data

US 2007/0028469 A1 Feb. 8, 2007

(51) Int. Cl.
*G01B 11/26* (2006.01)
(52) U.S. Cl. ....................................................... 33/286
(58) Field of Classification Search ................ 33/286, 33/227, 228, 282, 283, 285, 290, 291, 375
See application file for complete search history.

(56) References Cited

U.S. PATENT DOCUMENTS

| | | | |
|---|---|---|---|
| 1,153,760 A | 9/1915 | Butler | |
| 3,628,874 A | 12/1971 | Tagnon et al. | |
| 3,635,565 A | 1/1972 | Colson | |
| 3,820,903 A | 6/1974 | Kindl et al. | |
| 3,897,637 A | 8/1975 | Genho | |
| 3,964,824 A | 6/1976 | Dixon | |
| 4,031,629 A | 6/1977 | Paluck | |
| 4,111,564 A | 9/1978 | Trice, Jr. | |
| 4,221,483 A | 9/1980 | Rando | |
| 4,607,437 A * | 8/1986 | McSorley et al. | 33/375 |
| 4,751,782 A | 6/1988 | Ammann | |
| 4,852,265 A | 8/1989 | Rando et al. | |
| 4,854,704 A | 8/1989 | Funazaki et al. | |
| 4,912,851 A | 4/1990 | Rando et al. | |
| 4,993,161 A | 2/1991 | Borkovitz | |
| 5,075,977 A | 12/1991 | Rando | |
| 5,144,487 A | 9/1992 | Hersey | |
| 5,208,438 A | 5/1993 | Underberg | |
| 5,243,398 A | 9/1993 | Nielsen | |
| 5,287,365 A | 2/1994 | Nielsen et al. | |
| 5,287,627 A | 2/1994 | Rando | |

(Continued)

FOREIGN PATENT DOCUMENTS

WO 9851994 11/1998

OTHER PUBLICATIONS

First Office Action from Chinese Examiner for Chinese Application No. 02810031.X corresponding to U.S. Application, dated Jul. 29, 2005 (Chinese Version and English translation).

*Primary Examiner*—Christopher W. Fulton
(74) *Attorney, Agent, or Firm*—Dennis J. Williamson; Moore & Van Allen PLLC (57) ABSTRACT

A reflector for projecting a laser beam in a fan-shaped plane of light are provided. Associated with each reflector is at least one light source. Each light source is oriented relative to its associated reflector such that the axis of the beam of light hits the reflector off-center to generate a plane of light that is dispersed less than 360 degrees. Multiple planes of light generated by the reflector and light sources are projected in a common plane such that the independently generated planes of light overlap to create a single plane of light dispersed up to 360 degrees.

24 Claims, 12 Drawing Sheets

U.S. PATENT DOCUMENTS

| | | |
|---|---|---|
| 5,335,244 A | 8/1994 | Dugan et al. |
| 5,367,779 A | 11/1994 | Lee |
| 5,394,616 A | 3/1995 | Claxton |
| 5,400,514 A | 3/1995 | Imbrie et al. |
| 5,459,932 A | 10/1995 | Rando et al. |
| 5,500,524 A | 3/1996 | Rando |
| 5,519,942 A | 5/1996 | Webb |
| 5,524,352 A | 6/1996 | Rando et al. |
| 5,531,031 A | 7/1996 | Green |
| 5,533,268 A | 7/1996 | Keightley |
| 5,539,990 A | 7/1996 | Le |
| 5,552,886 A | 9/1996 | Kitajima et al. |
| 5,617,202 A | 4/1997 | Rando |
| 5,617,645 A | 4/1997 | Wick et al. |
| 5,621,975 A | 4/1997 | Rando |
| 5,666,736 A | 9/1997 | Wen |
| 5,742,387 A | 4/1998 | Ammann |
| 5,754,582 A | 5/1998 | Dong |
| 5,782,003 A | 7/1998 | Bozzo |
| 5,819,424 A | 10/1998 | Ohtomo et al. |
| 5,836,081 A | 11/1998 | Orosz, Jr. |
| 5,838,431 A | 11/1998 | Hara et al. |
| 5,842,282 A | 12/1998 | Ting |
| 5,864,956 A | 2/1999 | Dong |
| 5,872,657 A | 2/1999 | Rando |
| 5,898,809 A | 4/1999 | Taboada et al. |
| 5,907,907 A | 6/1999 | Ohtomo et al. |
| 5,917,587 A | 6/1999 | Rando |
| 5,967,645 A | 10/1999 | Anderson |
| 5,983,510 A | 11/1999 | Wu et al. |
| 5,992,029 A | 11/1999 | Dong |
| 6,005,716 A | 12/1999 | Ligtenberg et al. |
| 6,005,719 A | 12/1999 | Rando |
| 6,009,630 A | 1/2000 | Rando |
| 6,012,229 A | 1/2000 | Shiao |
| 6,014,211 A | 1/2000 | Middleton et al. |
| 6,035,540 A | 3/2000 | Wu et al. |
| 6,037,874 A | 3/2000 | Heironimus |
| 6,043,879 A | 3/2000 | Dong |
| 6,065,217 A | 5/2000 | Dong |
| 6,069,748 A | 5/2000 | Bietry |
| 6,073,353 A | 6/2000 | Ohtomo et al. |
| 6,073,354 A | 6/2000 | Rando |
| 6,082,875 A | 7/2000 | Kousek |
| 6,087,645 A | 7/2000 | Kitajima et al. |
| 6,150,943 A | 11/2000 | Lehman et al. |
| 6,163,969 A | 12/2000 | Jan et al. |
| 6,167,630 B1 | 1/2001 | Webb |
| 6,178,649 B1 | 1/2001 | Wu |
| 6,202,312 B1 | 3/2001 | Rando |
| 6,256,895 B1 | 7/2001 | Akers |
| 6,351,890 B1 | 3/2002 | Williams |
| 6,360,446 B1 | 3/2002 | Bijawat et al. |
| 6,493,955 B1 | 12/2002 | Moretti |
| 6,502,319 B1 | 1/2003 | Goodrich et al. |
| 6,539,638 B1 | 4/2003 | Pelletier |
| 6,568,094 B2 | 5/2003 | Wu |
| 6,577,388 B2 | 6/2003 | Kallabis |
| 6,598,304 B2 | 7/2003 | Akers |
| 6,675,489 B2 | 1/2004 | Ohtomo et al. |
| 6,679,609 B2 | 1/2004 | Ohtomo et al. |
| 6,688,011 B2 | 2/2004 | Gamal et al. |
| 6,710,929 B2 | 3/2004 | Phuly et al. |
| 6,722,048 B2 | 4/2004 | Huang et al. |
| 6,735,879 B2 | 5/2004 | Malard et al. |
| 6,751,879 B1 * | 6/2004 | Pu ............................. 33/286 |
| 6,754,969 B2 | 6/2004 | Waibel |
| 6,829,834 B1 | 12/2004 | Krantz |
| 6,833,962 B2 * | 12/2004 | Bergen ....................... 33/227 |
| 6,842,291 B2 | 1/2005 | Bergen |
| 6,871,408 B2 | 3/2005 | Malard et al. |
| 6,914,930 B2 | 7/2005 | Raskin et al. |
| 6,931,737 B1 * | 8/2005 | Liao ........................... 33/227 |
| 6,935,034 B2 | 8/2005 | Malard et al. |
| 6,938,350 B1 * | 9/2005 | Hersey ....................... 33/286 |
| 2003/0029049 A1 * | 2/2003 | Huang et al. ............... 33/286 |
| 2003/0231303 A1 | 12/2003 | Raskin et al. |
| 2004/0187327 A1 | 9/2004 | Levine |
| 2004/0216313 A1 | 11/2004 | Marshall et al. |
| 2005/0005462 A1 | 1/2005 | Heger et al. |
| 2005/0022399 A1 | 2/2005 | Wheeler et al. |

* cited by examiner

LASER LEVEL

BACKGROUND

The invention relates generally to leveling devices and more particularly to an improved laser level device.

Traditional leveling tools consist of one or more level vials mounted in a level body. The level body has one or more leveling faces that are calibrated with reference to the level vials such that one of the leveling faces can be placed against a surface and level readings made from the level vials. Laser level devices consist of a body supporting a laser generating device and a lens for focusing the laser. The lens can focus the laser into a beam of light or a plane of light and project the light from the body onto a surface. The light pattern projected on the surface can be used as a reference point for locating and orienting articles. At least one level vial is mounted on the body for orienting the body relative to true plumb or true level to control the projection of the light onto the surface.

For some applications it is desirable to project a plane of light over 360 degrees such that the plane of light may be projected, for example, on all four walls of a room simultaneously. Known laser levels do not provide an effective mechanism for projecting a plane of light where the plane of light is of sufficient intensity that it is clearly visible over a wide angle up to and including 360 degrees. Moreover, known laser levels that project a plane of light are not of a simple and compact construction that is economical to manufacture and suitable for use as a hand tool.

Thus, an improved laser level device that is capable of projecting a highly visible plane of light in a wide pattern is desired.

SUMMARY

The laser level of the invention consists of a plurality of optical elements including reflectors for projecting a laser beam in a fan-shaped plane of light. Associated with each reflector is a laser light source. Each laser light source is oriented relative to its associated reflector such that the axis of the beam of light hits the reflector off-center to generate a plane of light that is effectively dispersed less than 360 degrees. The multiple planes of light generated by the multiple reflectors are projected in a common plane such that the independently generated planes of light overlap to create a single plane of light dispersed up to 360 degrees.

DETAILED DESCRIPTION OF PREFERRED EMBODIMENTS OF THE INVENTION

Referring more particularly to FIGS. 1 through 4 the laser level of the invention is shown generally at 1 and comprises a chassis 2 having a back wall 4, a bottom wall 6 and a top wall 8. A first side wall assembly 10 and a second identical sidewall assembly 12 extend from back wall 4 at the lateral edges thereof. Each sidewall assembly 10 and 12 includes a battery cradle 15 defined by a first wall portion 14 and a second wall portion 16 for supporting batteries 18 and 20, respectively. Batteries are inserted into the laser level 1 through apertures 22 and 24 formed in bottom wall 6 in the assembled device. A battery door 26 is pivotally connected to bottom wall 6 to close apertures 22 and 24. A screw 28 or other latch is used to maintain the door 26 in the closed position. A battery terminal 30 is mounted on the inside surface of door 26 and contacts batteries 18 and 20 to form part of the electrical circuit for powering the lasers as will be understood. Laser housing 27 houses laser modules 76, 78 and 80 as will hereinafter be described.

Apertures 32a and 32b are formed on the bottom wall 6 on either side thereof and slidably receive flat adjusting screws 34a and 34b. Adjusting screw 34a is threaded into a threaded hole in adjusting knob 36a such that when knob 36a is rotated, screw 34a slides in aperture 32a such that it can be extended from or retracted into bottom wall 6. Likewise, adjusting screw 34b threadably engages adjusting knob 36b such that when knob 36b is rotated, screw 34b slides in aperture 32b such that it can be extended from or retracted into back wall 6 The adjusting screws 34a and 34b and protrusion 38 support laser level 2 in the upright position illustrated in FIG. 3. By rotating the knobs 36a and 36b, the angle of the laser level can be adjusted. The screws 34a and 34b can be extended from bottom wall 6 such that the screws and protrusion define a plane, the orientation of which can be varied relative to the laser modules.

A transverse aperture 40 is provided that slidably receives threaded flat adjusting screw 41. Adjusting screw 41 is threaded into a mating threaded hole in adjusting knob 42 such that when knob 42 is rotated, screw 41 slides in aperture 40 such that it can be extended from or retracted into back wall 4. Back wall 4 supports the laser level 2 in the horizontal position shown in FIG. 2 when screw 41 is completely retracted into the chassis 2. By rotating knob 42 to extend screw 41 a desired distance out of back wall 4, the angle of the laser level can be adjusted relative to horizontal. Located on the back wall 4 of the device is an adjustment flap 100. Flap 100 is pivotally connected to the back wall 4 in recess 104. Flap 100 can be manually extended from the recess 104 such that it extends substantially perpendicularly to back wall 4 to support the device on a surface such that back wall 4 is spaced from the surface. When flap 100 is extended and the adjusting screw 41 is extended or retracted, flap 100 acts as a fulcrum allowing the device to have both positive and negative angular adjustment. Referring to FIG.

Figure 1:
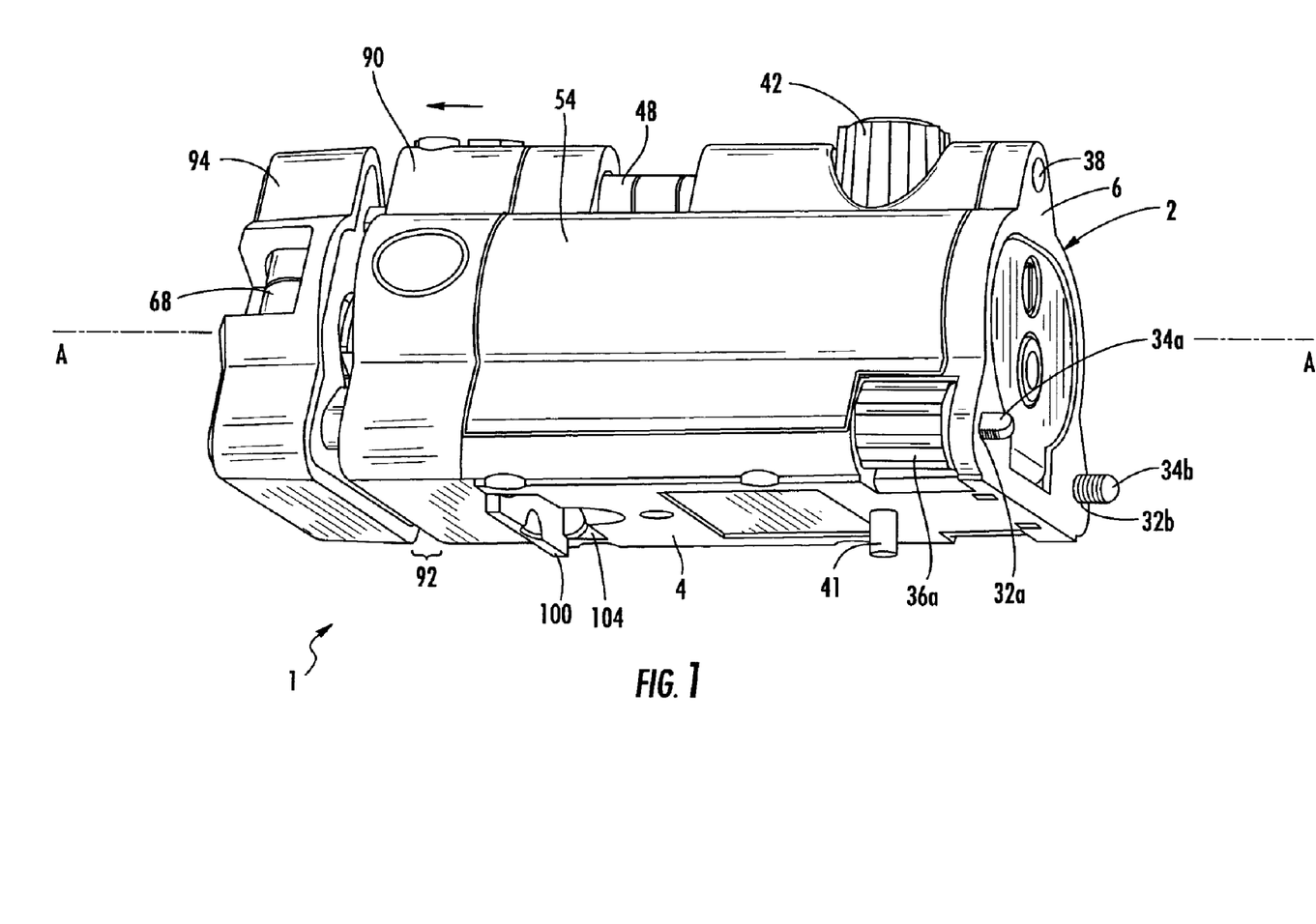
FIG. 1 is a perspective view of one embodiment of the laser level of the invention.
Figure 2:
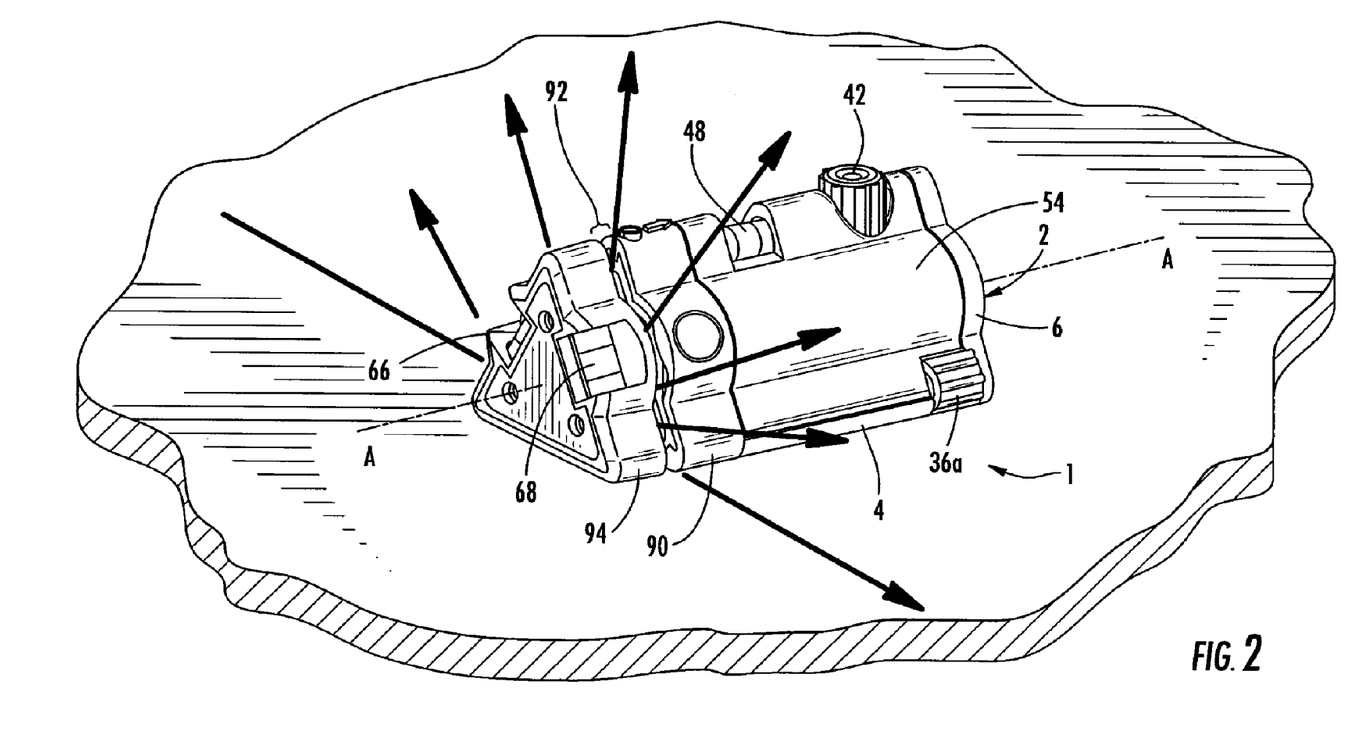
FIG. 2 is another perspective view of the embodiment of FIG. 1 showing the projection of light in a vertical plane.
Figure 3:
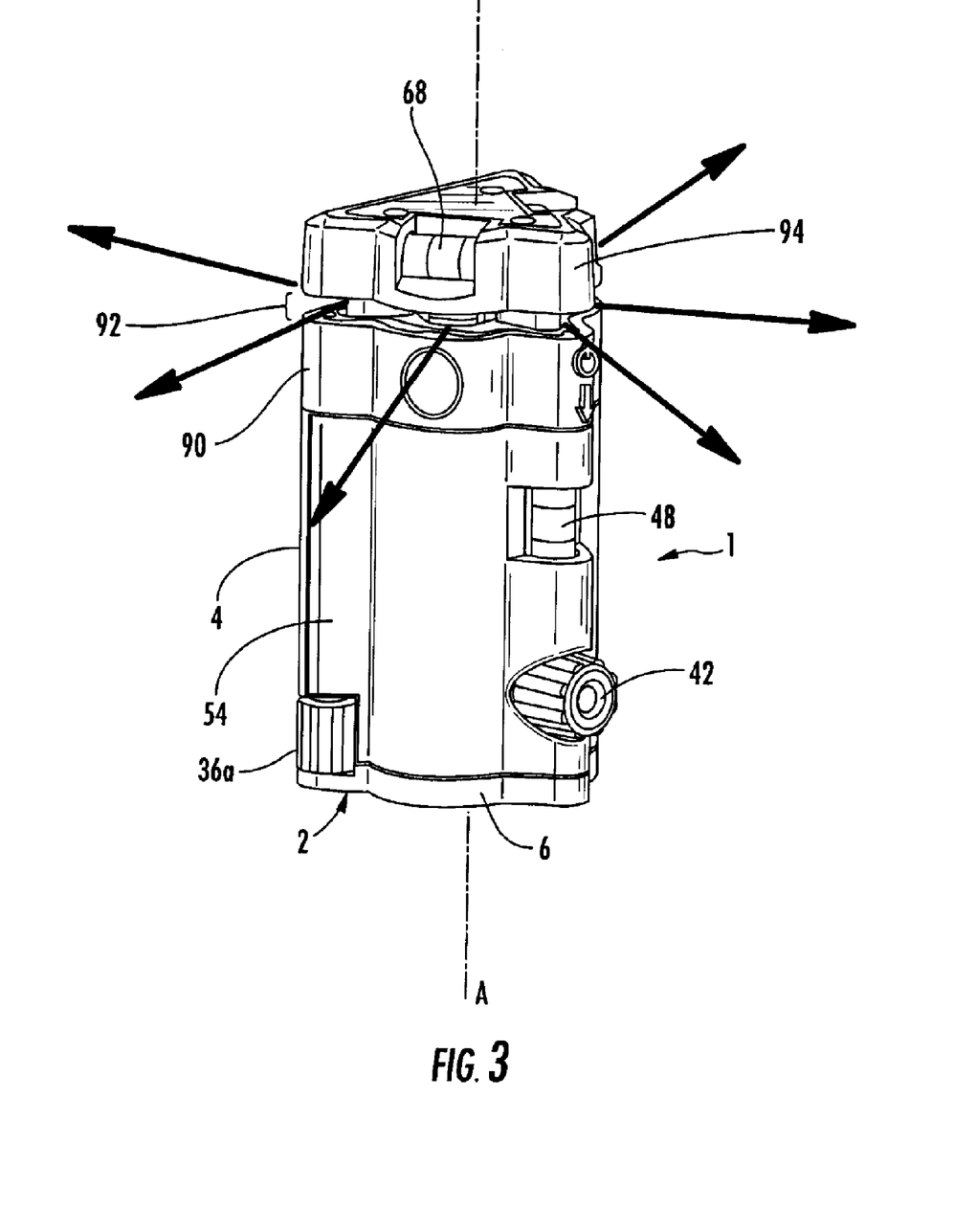
FIG. 3 is another perspective view of the embodiment of FIG. 1 showing the projection of light in a horizontal plane.

2, when the device is placed on a horizontal surface the plane of light is projected substantially perpendicularly to the surface. With the flap 100 extended and in contact with the surface, screw 41 can be extended from or retracted into back wall 4 to pivot the plane of light to either a positive or negative angle relative to vertical. Without the flap 100 (or with flap 100 retracted into recess 104) screw 41 can only adjust the plane of light from the vertical to a positive angle relative to vertical.

A pair of cradles 44 and 46 are provided for receiving and retaining opposite ends of front level vial 48. Level vial 48 may be a bubble vial for indicating inclination as is known in the art. Cradles 44 and 46 are arranged such that the longitudinal axis of vial 48 is parallel to back wall 4 and perpendicular to bottom wall 6. Thus if back wall 4 is placed on a true horizontal surface, level vial 48 will show the laser level as level.

A switch 50 is mounted on front cover 54 and is in electrical communication between batteries 18 and 20 and laser modules 76, 78 and 80 by electrical conductors such as wires or the like. The switch 50 controls the turning on and turning off of the lasers as will hereinafter be described. A front cover 54 fits over the assembly 2 such that adjusting knob 42 is received in aperture 56, level vial 48 is visible through aperture 58 and switch 50 extends through aperture 52. The front cover is secured to assembly 2 by a snap fit, screws or other fastening mechanism such that the cover retains the knob 42, level vial 48, batteries and switch in the desired position.

Top wall 8 has a first pair of cradles 60a and 60b and a second pair of cradles 62a and 62b. Cradles 60a and 60b support level vial 66 and cradles 62a and 62b support level vial 68. The level vials are disposed such that the longitudinal axis of level vial 66 is parallel to a line drawn between protrusion 38 and screw 34b and the longitudinal axis of level vial 68 is parallel to a line drawn between protrusion 38 and screw 34a. The effect of such an arrangement is that when either screw 34a or 34b is extended or retracted the opposite level vial is pivoted about its longitudinal axis. Level vials 66 and 68 may consist of bubble vials as are known in the art. The longitudinal axes of level vials 66 and 68 are parallel to bottom wall 6 and perpendicular to back wall 4 in one direction. Thus if bottom wall 6 is placed on a true horizontal surface, level vials 66 and 68 will show the laser level as level. Top wall 8 further includes flanges 69 and 71 that define the outer perimeter of the top wall.

Three apertures 70, 72 and 74 are formed in top wall 8 where the apertures are coextensive with laser module housing 27 formed in the body for receiving laser modules 76, 78 and 80 respectively. The laser modules may consist of a laser diode, a collimating lens and a cylindrical housing encasing these elements as is known in the art. Laser modules 76, 78 and 80 are oriented such that each projects a beam of collimated light parallel to the longitudinal axis A-A of the laser level 1, perpendicular to bottom wall 6 and parallel to back wall 4. An optical assembly 82 is disposed in the path of the projected beams and includes conical reflectors 84, 86 and 88. One of the reflectors is disposed in the path of each of the beams of light to reflect the beams of light in a fan shaped pattern where the fan is in a plane parallel to back wall 6 and perpendicular to the bottom wall 4 and the longitudinal axis A-A of the device. The specific arrangement of the laser modules and optical assembly will hereinafter be described in greater detail.

A sliding cover 90 is slidably mounted on flanges 51a, 51b and 51c such that it can freely move in a direction along the longitudinal axis A-A of the device. Cover 90 can move between an open position where it contacts surface 53 of front cover 54 (shown in FIG. 1-3) and a closed position where it contacts end cap 94. Cover 90 is dimensioned such that when it is in the open position a gap 92 is created between cover 90 and end cap 94. Gap 92 provides the portal for the fans of light to exit the laser level. When the cover 90 is moved to the closed position, gap 92 is closed preventing access to the lens assembly and laser modules. When cover 90 is in the open position an inside surface of the cover contacts switch 50 to turn the switch "on" and power the laser modules by completing the electrical circuit from the batteries to the laser modules. When the cover is moved to the closed position, the switch is released and power to the laser modules is interrupted thereby turning off the device. In the closed position cover 90 protects the lens assembly and laser modules. Thus, movement of the cover 90 not only creates gap 92, it also turns on and off the laser level. End cap 94 is secured to end wall 8 by screws 98 or other fastening mechanism to complete the assembly.

Operation of the laser modules 76, 78 and 80 and optical assembly 82 will now be described with reference to FIGS. 5 through 10. Reference will initially be made to the two reflector optical assembly 109 of FIG. 7. The two reflector optical assembly 109 consists of a plurality of conical reflectors 110 arranged symmetrically about center line B-B of the lens assembly. Center line A-A is parallel to centerline B-B. In one embodiment centerline B-B is disposed on the centerline A-A of the laser level. In the illustrated embodiment the conical reflectors 110 comprise hollows formed in a solid transparent block of material 111 such as acrylic. The reflectors 110 could also be formed as hollows in separate blocks of material if desired. Using hollow cones formed in a solid block of transparent material total internal reflection (TIR) is used to reflect the light. The reflectors could also be formed as solid reflective cones. Other reflector configurations are also possible. Each reflector has associated therewith a laser module 112 where each laser module projects a beam of collimated light 116 towards its associated reflector.

Figure 8:
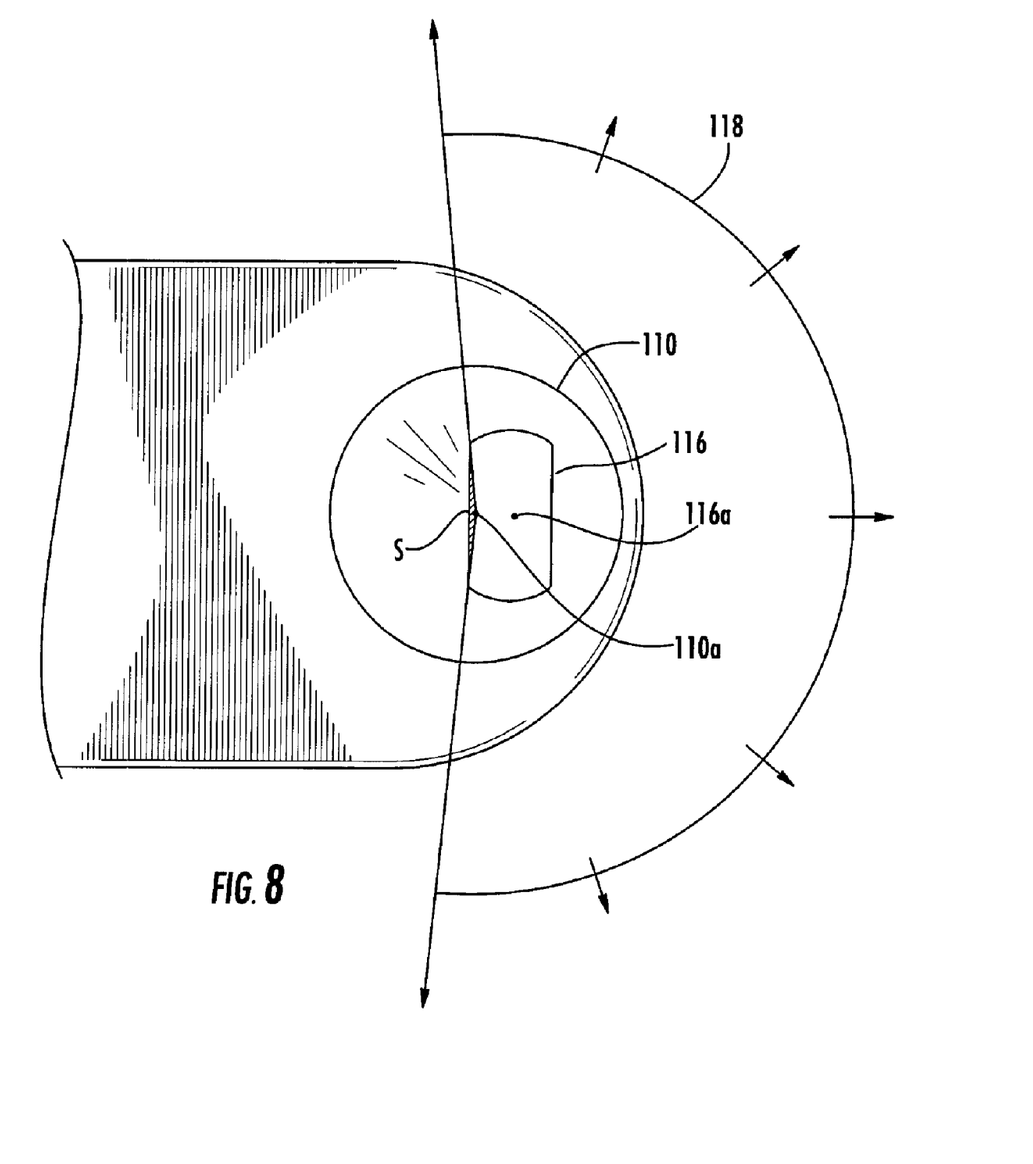
FIG. 8 is a schematic plan view showing the contact between the light beam and reflector of the invention.
Figure 9:
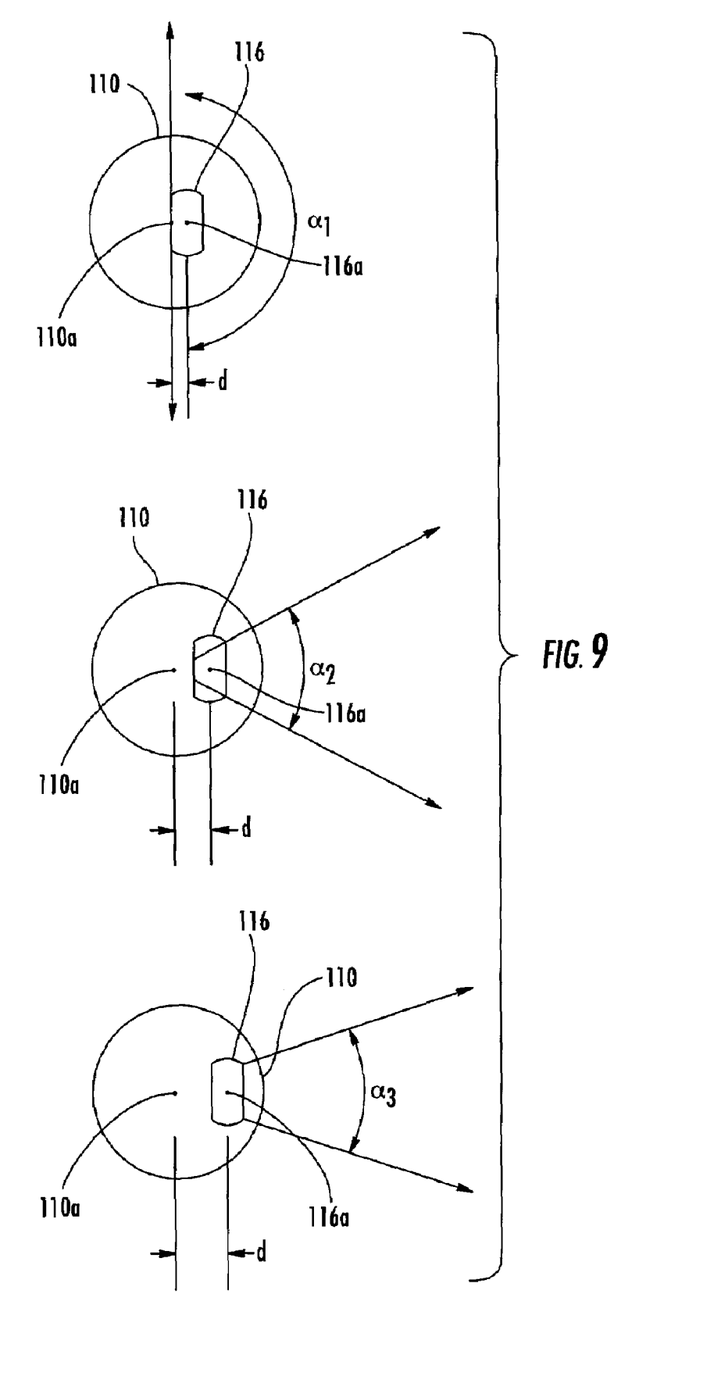
FIG. 9 is a schematic plan view showing the contact between the light beam and reflector of the invention.

Referring to FIG. 8 the longitudinal axis 116a of the beam of light 116 is oriented off-center from the axis 110a of conical reflector 110 such that the beam axis 116a strikes the reflector 110 at a position displaced from the lens axis 110a. It will be understood that if the axis 110a of the reflector is located within the beam profile as shown in FIG. 8 a 360 degree dispersion of the light will occur. However, because the amount of light striking the reflector on the opposite side of axis 110a (as shown by shaded area S) is small, the intensity of the reflected light will be very low and the effect of this reflected light will be negligible. As a result for practical purposes the effective plane of light reflected by reflector 110 is the fan of light 118. The greater the distance d between the reflector axis and beam axis the smaller the dispersion angle α of the fan of light 118 and the narrower the fan of light projected from the reflector as best illustrated in FIG. 9. It will be understood that the angle formed by the surface of the conical reflector is selected such that the fan of light reflected from the reflector will be at a right angle relative to the beam of light projected by the laser modules. Moreover, the reflectors are arranged such that the planes of light reflected from the reflectors are coplanar. In the illustrated embodiments this is accomplished by using identical reflectors 110 located in the same plane where the beams of light 116 from the laser modules strike the reflectors at the same position relative to the axis 110a of lens 110. With a two reflector system, in order to get 360 degrees of coverage, the axis of the laser beam is offset from the axis of the lens such that the reflected fan of light covers about 180 degrees.

In one embodiment each fan of light covers approximately 190 degrees such that the independently generated coplanar fans of light overlap at their edges. In this manner a 360 degree uninterrupted plane of light is projected from the device.

Figure 12:
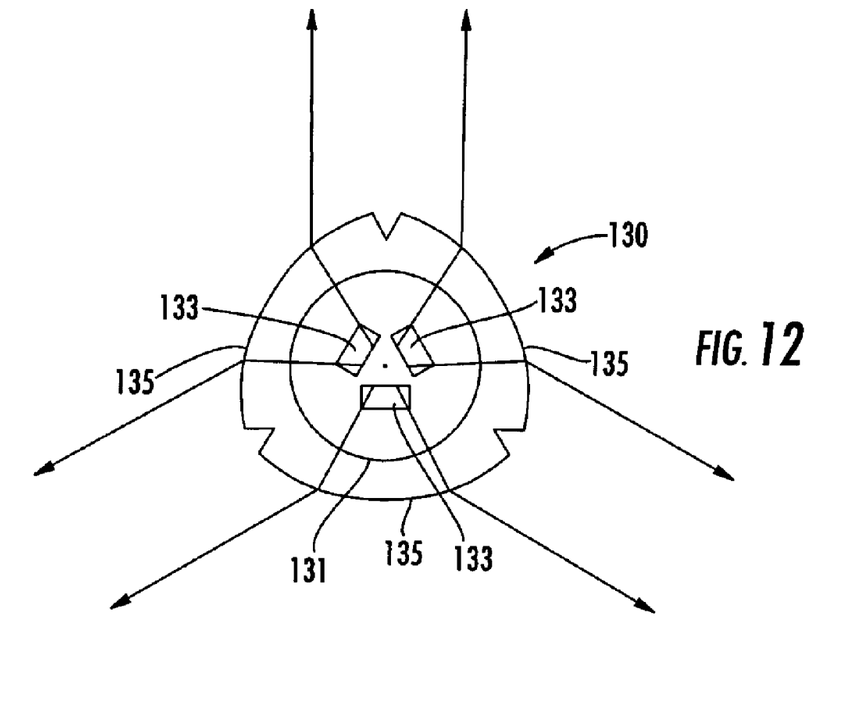
FIG. 12 is a schematic pan view of another alternative embodiment of the optical assembly of the invention.
Figure 13:
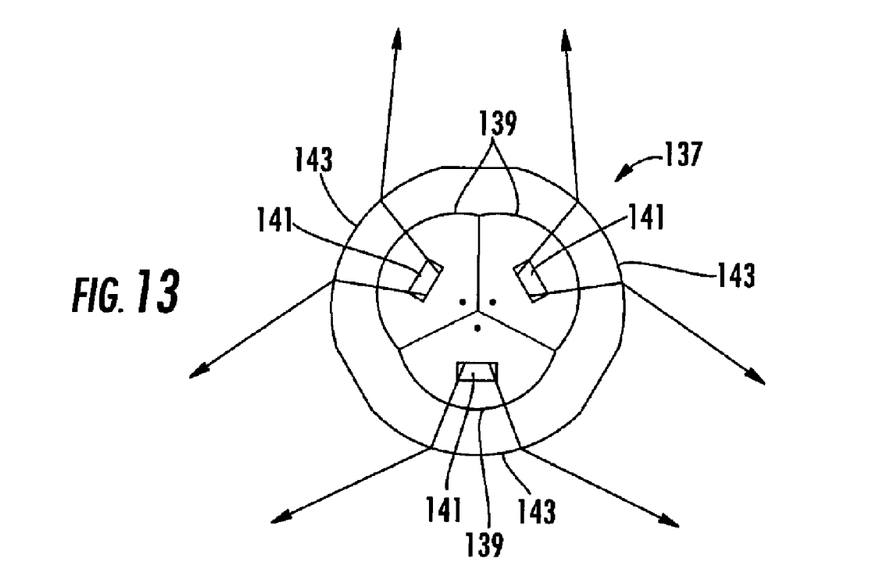
FIG. 13 is schematic plan view of another alternative embodiment of the optical assembly of the invention.

Other alternate embodiments of the laser modules and reflectors are possible. For example, an optical element 130 including a single conical reflector 131 can be used with multiple laser modules arranged symmetrically about the reflector such that the beams of light 133 from each laser source strikes the reflector to create a portion of the plane of light as shown in FIG. 12. Optical element 130 can be formed with lenses 135 to further disperse the light as previously explained with respect to FIG. 6. Because of space constraints, in order to arrange multiple light sources about a single reflector it may be necessary to redirect the light from the laser modules before the light strikes the reflector. Referring to FIG. 13 another possible configuration is optical assembly 137 having multiple reflectors 139 each reflecting a separate light beam 141 where the reflectors 139 are formed of a single piece of material and intersect one another. Lenses 143 could be formed in optical element 137 to further disperse the light as previously explained with respect to FIG. 6.

Figure 4:
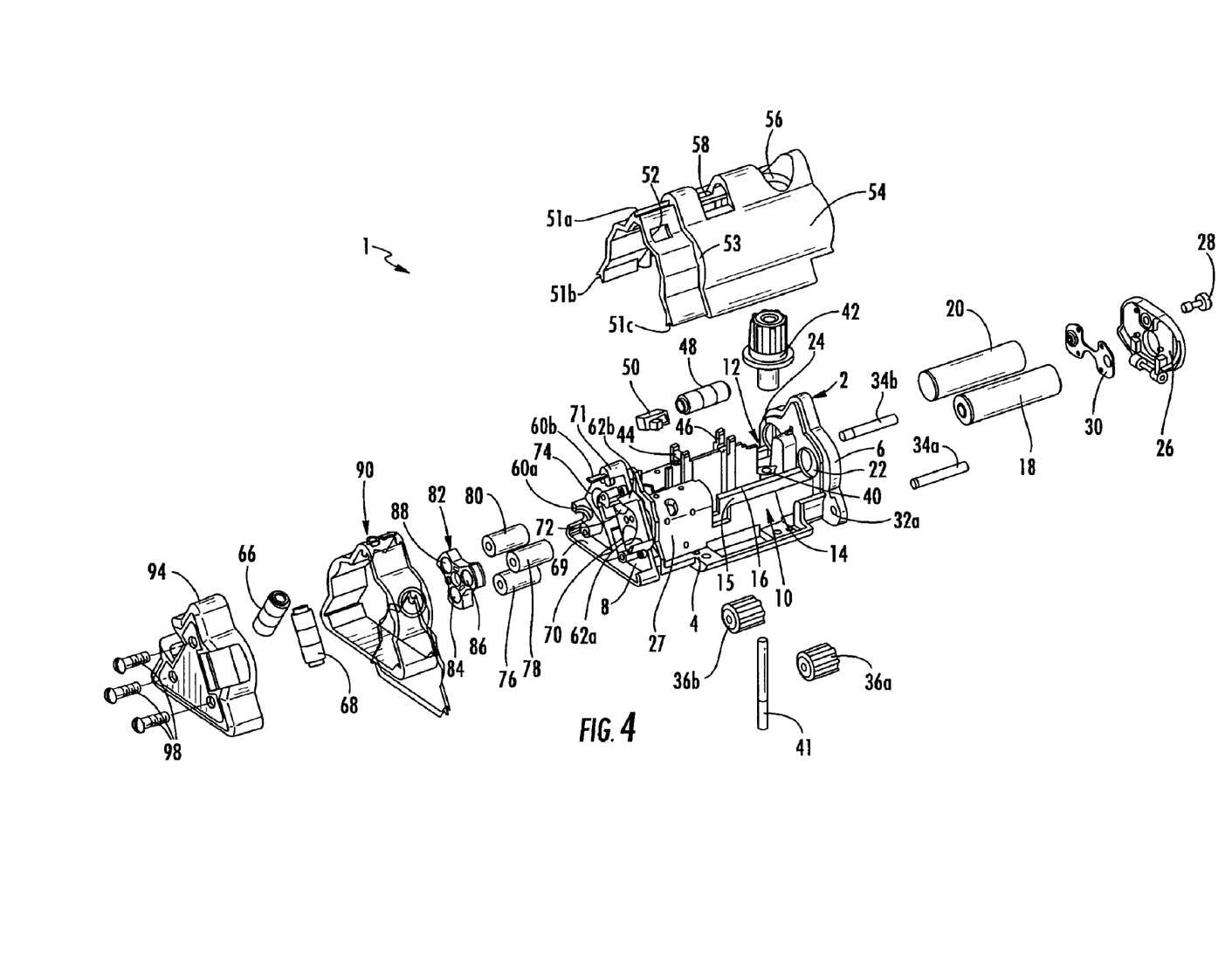
FIG. 4 is an exploded perspective view of the embodiment of the laser level of the invention shown in FIG. 1.
Figure 5:
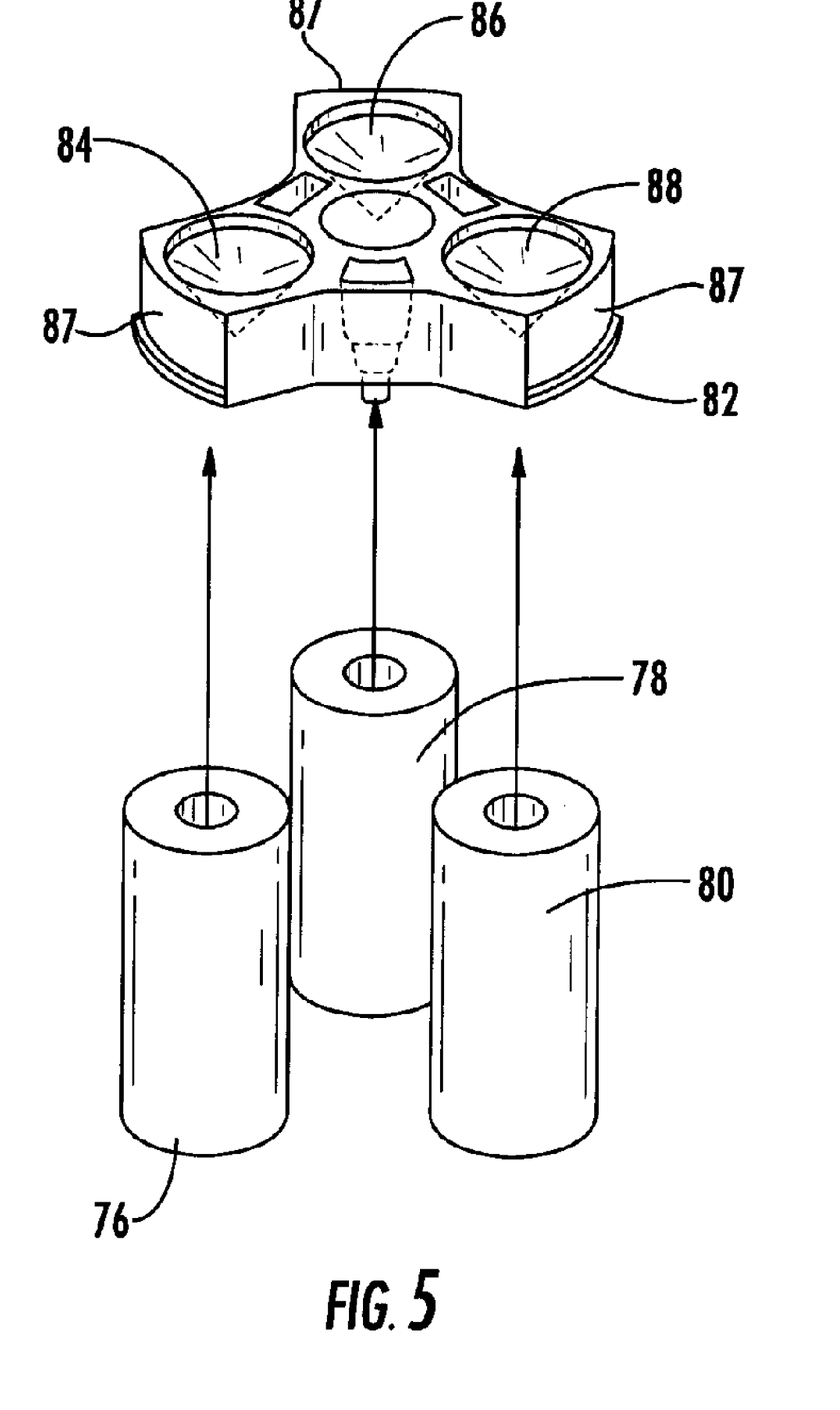
FIG. 5 is a perspective view of an embodiment of the optical assembly and laser modules used in the laser level of the invention.
Figure 6:
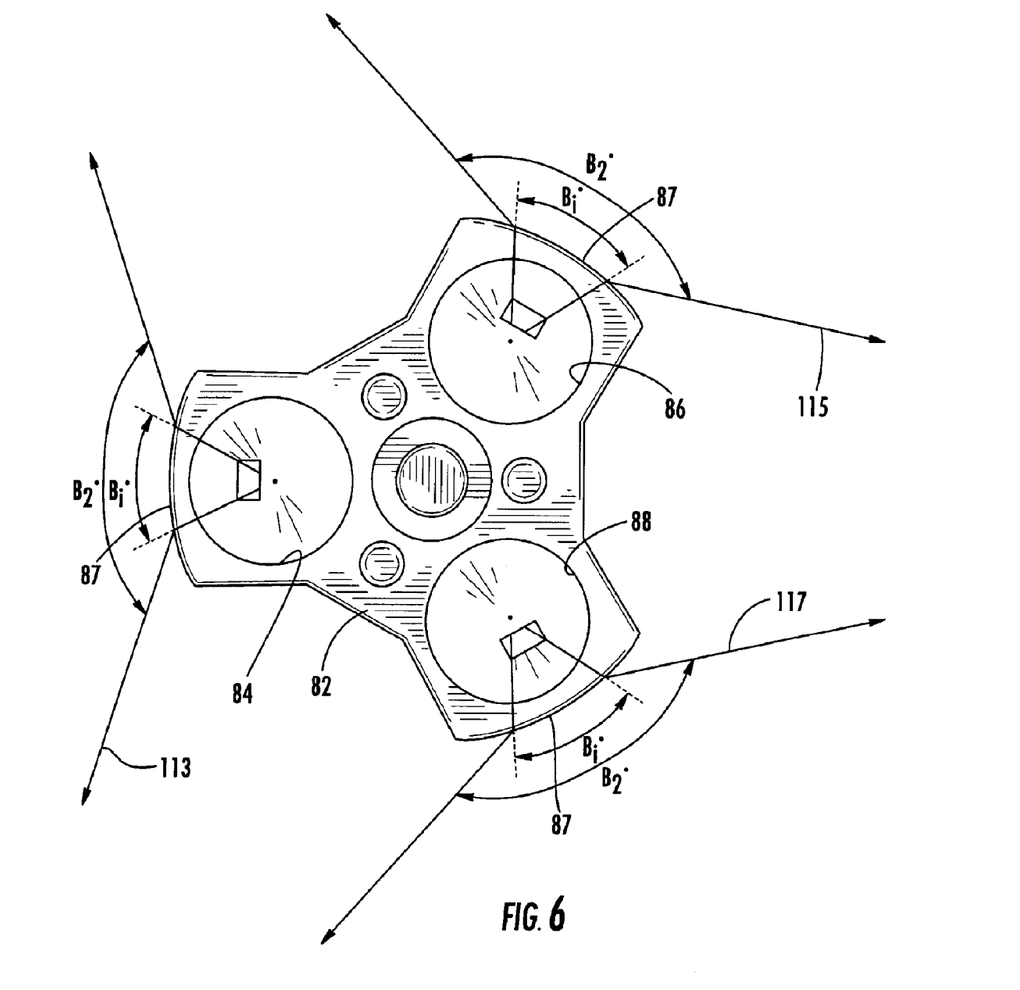
FIG. 6 is a plan view of the optical assembly of FIG. 5.
Figure 7:
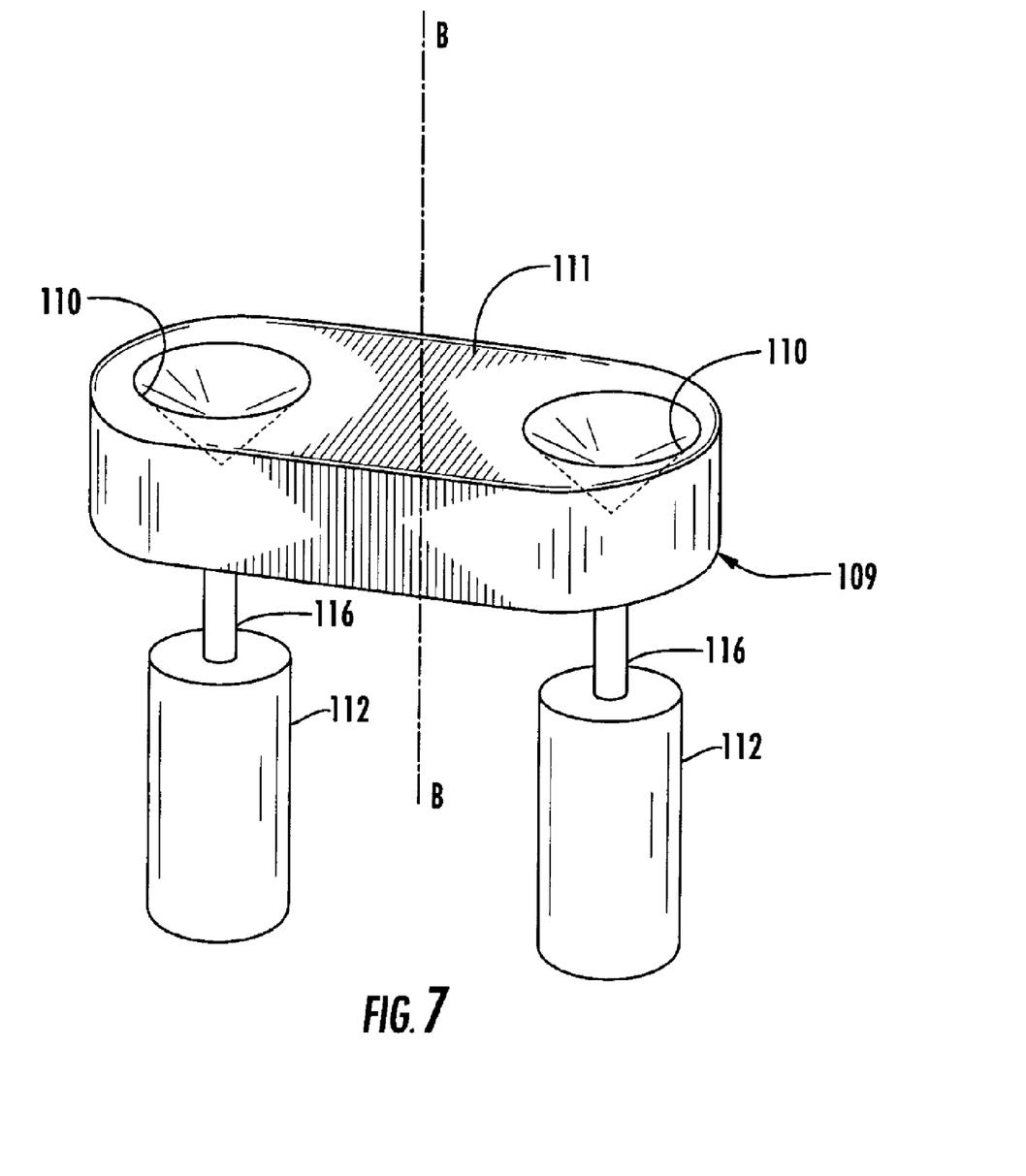
FIG. 7 is a perspective view showing another embodiment of the optical assembly used in the laser level of the invention.
Figure 10:
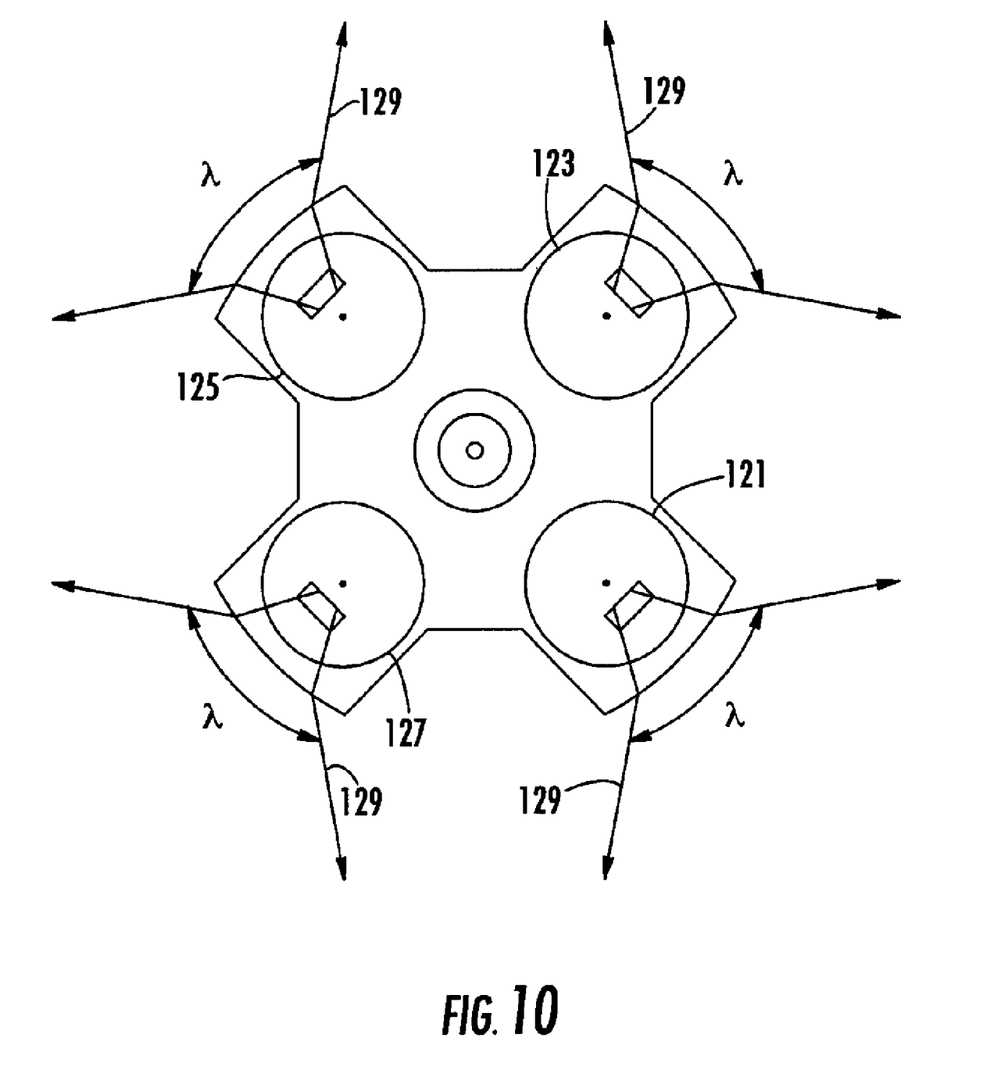
FIG. 10 is a schematic view showing an alternate arrangement of the optical assembly and reflected light patterns.

In one embodiment of the laser level 1, three reflectors 84, 86 and 88 and three laser modules 76, 78 and 80 are used, as shown in FIGS. 4-6, such that each reflector reflects its fan of light over a dispersion angle $\beta_1$ of approximately 100 degrees and each curved outside surfaces 87 of the optical assembly acts as a lens to further fan the angle of the light to an angle $\beta_2$ of approximately 130 degrees. In the three lens system each independently generated fan of light 113, 115 and 117 may disperse over an angle $\beta_2$ of 130 degrees such that the three coplanar fans of light intersect or overlap to create an uninterrupted 360 degree plane of light. A system using four reflectors 121,123,125 and 127 and four laser sources is illustrated in FIG. 10 where each fan of light 129 has a dispersion angle $\lambda$ of approximately 90 degrees. The system of the invention can be scaled to use any plural number of reflectors and corresponding laser light sources. By using plural light sources each covering only a portion of the total area covered by the device, the system of the invention can achieve a brighter, higher intensity light while using less powerful laser sources. In the three reflector system of FIGS. 4-6 and the four reflector system of FIG. 10 and in systems using greater numbers of reflectors, the reflectors and lasers are arranged as previously described with respect to the two reflector system of FIGS. 7 and 8 such that the independently generated fans of light are coplanar and intersect or overlap to create a continuous plane of light emanating from laser level 1.

In one embodiment the each conical reflector is a 90 degree cone having a radius of approximately 8.5 millimeters. Lens 87 has a radius of curvature of approximately 12.46 millimeters. The axis of the beam of light is offset from the axis of the reflector approximately two millimeters providing a space between the edge of the light beam and the axis of the reflector of approximately one millimeter.

Figure 11:
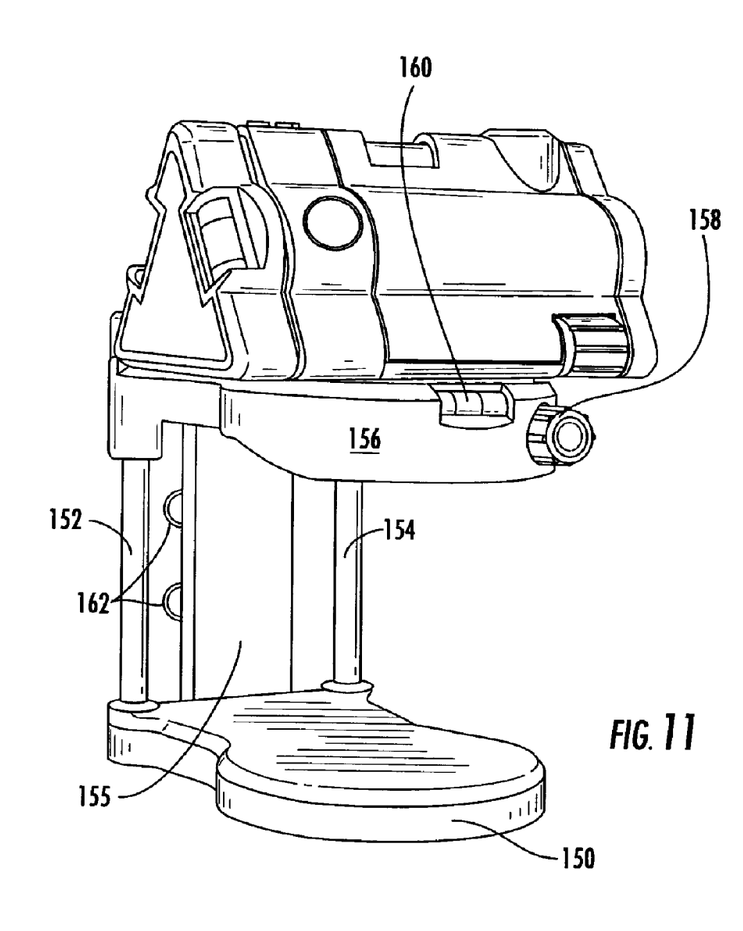
FIG. 11 is a perspective view showing a mounting system of the invention for use with the laser level of the invention.

A mounting system for mounting the laser level of the invention on either a vertical or horizontal surface is shown in FIG. 11 and consists of a base 150 that can rest on a surface. The base supports a pair of slide members 152 and 154 that extend perpendicular to the base. The slide members 152 and 154 may be made of steel or other rigid material. A movable level support 156 is slidably received on slide members 152 and 154 such that support can slide up and down on the slide members. A rack and pinion drive is provided for moving the support 156 on slide members 152 and 154. A rack is vertically disposed in housing 155 and is engaged by a mating pinion rotatably supported in support 156. Knob 158 is connected to pinion such that rotation of knob 158 turns the pinion which engages the rack to move support 156 either up or down on slide members 152 and 154. A bubble level 160 is provided to generate a visual indication of the orientation of support 156. The mounting system in addition to resting on a horizontal surface can be mounted to a vertical surface. In one embodiment the mounting system includes releasable two sided pressure activated tape 162 attached to the back surface of housing 155 to attach the mounting system to the vertical surface. The mounting system may also be attached to the vertical surface by other suitable mechanisms such as suction, a push pin, adhesive or the like.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

What is claimed is:

1. A tool comprising:
    a first reflector;
    a second reflector;
    a first beam of light reflecting off of the first reflector to create a first plane of light that is perpendicular to the first beam of light;
    a second beam of light reflecting off of the second reflector to create a second plane of light that is perpendicular to the second beam of light; and
    said first and second planes of light being coplanar.

2. The tool of claim 1 wherein the first and second reflectors are conical.

3. The tool of claim 2 wherein the first and second reflectors are substantially identical.

4. The tool of claim 1 wherein the first and second beams of light are collimated laser beams.

5. The tool of claim 1 wherein the second plane of light disperses at an angle of less than 360 degrees.

6. The tool of claim 1 wherein the first and second planes of light create a combined plane of light that extends for 360 degrees.

7. The tool of claim 1 further including a third reflector and a third beam of light reflecting off of the third reflector to create a third plane of light, said third plane of light being coplanar with the first and second planes of light.

8. The tool of claim 1 further including a level vial.

9. The tool of claim 8 wherein the level vial is parallel to said first and second planes of light.

10. The tool of claim 8 wherein the level vial is perpendicular to said first and second planes of light.

11. The tool of claim 1 wherein the tool is arranged at an angle relative to a surface, where said angle of the tool relative to said surface can be adjusted.

12. The tool of claim 11 wherein an adjustment screw is provided for adjusting the angle of the tool relative to the surface.

13. The tool of claim 11 further including a fulcrum for supporting the tool to adjust said angle.

14. The tool of claim 13 wherein the fulcrum comprises a flap that extends from said tool.

15. The tool of claim 1 further including a mounting system for mounting the laser level on a horizontal or vertical surface.

16. The tool of claim 15 wherein the mounting system includes a movable support separate from said tool.

17. The tool of claim 16 wherein the movable support can be raised or lowered while maintaining the angular orientation of the tool.

18. A tool comprising:
a first reflector having a first centerline;
a second reflector having a second centerline;
a first beam of light reflecting off of the first reflector a first distance from the first centerline to create a first plane of light;
a second beam of light reflecting off of the second reflector a second distance from the second centerline to create a second plane of light;
wherein the first and second planes of light are coplanar.

19. A tool comprising:
a reflector having a centerline;
a first beam of light reflecting off of the reflector a distance from the centerline to create a first plane of light; and
a second beam of light reflecting off of the reflector a second distance from the centerline to create a second plane of light.

20. A tool comprising:
a first reflector;
a second reflector;
a first beam of light reflecting off of the first reflector to create a first plane of light that is perpendicular to the first beam of light, wherein the first beam of light strikes the first reflector off-center;
a second beam of light reflecting off of the second reflector to create a second plane of light that is perpendicular to the second beam of light; and
said first and second planes of light being coplanar.

21. The tool of claim 20 further including a lens disposed such that light reflected from the first reflector passes through said lens.

22. The tool of claim 21 wherein the lens further disperses the light.

23. The tool of claim 20 wherein the second beam of light strikes the second reflector off-center.

24. A tool comprising:
a first reflector;
a second reflector;
a first beam of light reflecting off of the first reflector to create a first plane of light that is perpendicular to the first beam of light wherein the first plane of light disperses at an angle of less than 360 degrees;
a second beam of light reflecting off of the second reflector to create a second plane of light that is perpendicular to the second beam of light; and
said first and second planes of light being coplanar.

* * * * *